July 19, 1966  B. F. McNAMEE ET AL  3,262,015
OVERLOAD PROTECTION CIRCUIT
Filed June 11, 1962  2 Sheets-Sheet 2

INVENTORS.
RICHARD C. JOHNSON
BERNARD F. McNAMEE
By Flam and Flam
ATTORNEYS.

United States Patent Office 3,262,015
Patented July 19, 1966

3,262,015
OVERLOAD PROTECTION CIRCUIT
Bernard F. McNamee, Altadena, and Richard C. Johnson, Temple City, Calif., assignors to Dressen-Barnes Electronics Corporation, Pasadena, Calif., a corporation of California
Filed June 11, 1962, Ser. No. 201,447
5 Claims. (Cl. 317—20)

This invention relates to an overload protection circuit.

In a power supply regulated by a series transistor, the regulating transistor will normally be damaged by excessive current, voltage, or both that occurs upon the existence of a short circuit. The damage occurs virtually instantaneously. A device acting as slowly as a fuse or a relay is incapable of performing the protection function.

Trigger circuits have been used to switch the transistor off immediately upon the existence of a current beyond rated value. While the device is protected from excessive current, the full unregulated voltage is applied to the transistor upon the existence of an output short. Transistors are available that can tolerate voltages of about 75 volts. Hence, there is no problem if the power supply has a low voltage rating. The problem arises in connection with power supplies rated above 75 volts.

One solution is to divide the voltage by using a series of transistors. But this has proved to result in complicated and inefficient circuitry.

One of the primary objects of this invention is to provide an effective fast acting overload protection circuit for a series regulating transistorized power supply. For this purpose, use is made of a plurality of normally saturated protective transistors serially associated with the regulating transistor. Upon the existence of excessive current, the protective transistors are immediately cut off, and the voltage is divided among them. The regulating transistor is thus protected from the direct application of source voltage.

When the current is within rated value, the protective transistors, being saturated, use only nominal power, yet pass heavy currents. There is no need to parallel such protective transistors for current rating purposes.

Another object of this invention is to provide novel circuitry for overload protection of an A.C. line in which the cut off action is instantaneous and therefore 100% effective in the prevention of damage to a load.

Still another object of this invention is to provide a circuit of this character in which the circuitry for producing instantaneous cut-off is combined with a relay or other slow acting device such that the rating of components can be reduced without sacrifice of the instantaneous cut-off functions.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings.

Figure 1:
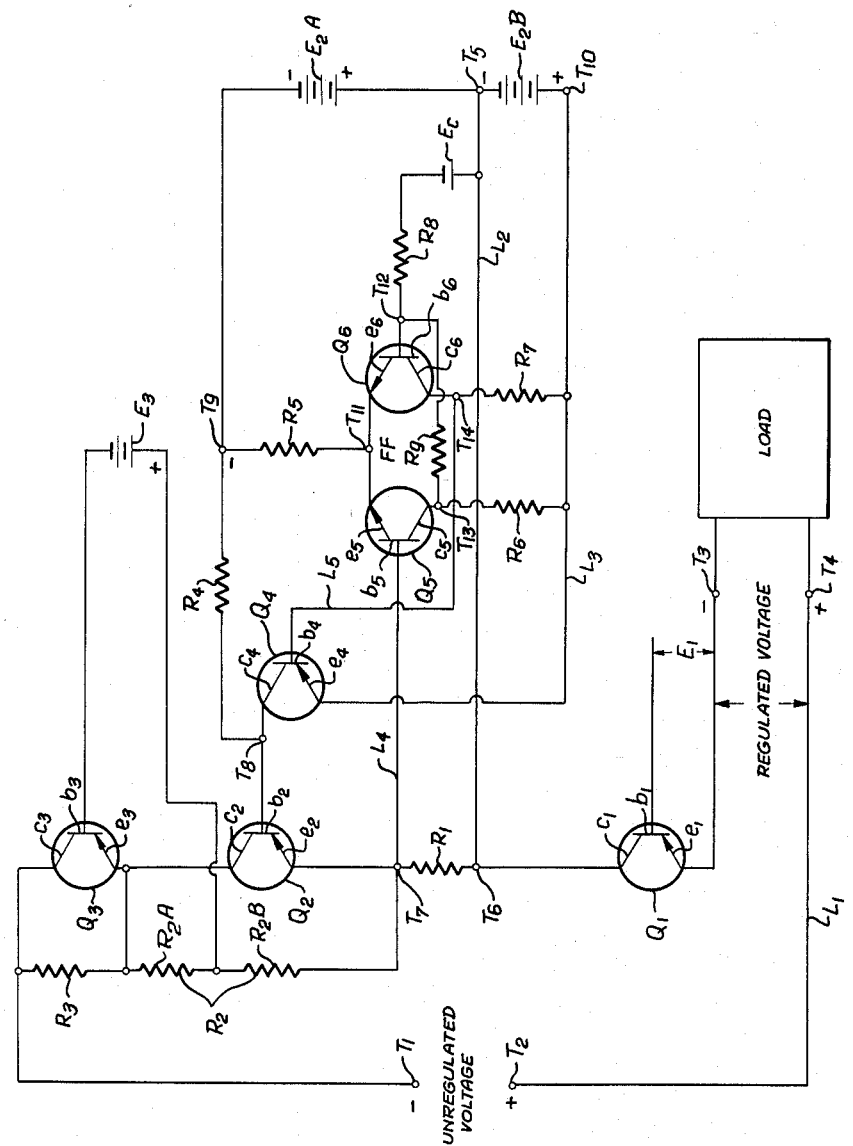
FIGURE 1 is a circuit diagram showing one form of the present invention.

In FIG. 1 there is illustrated diagrammatically a portion of a circuit of a series regulated transistorized power supply. An unregulated voltage is applied to input terminals T1 and T2, and a regulated voltage is derived from terminals T3 and T4. A common connection or lead L1 directly connects the input and output terminals T2 and T4. The terminals T1 and T3 are connected by a circuit that seriallly includes the collector $c1$ and emitter $e1$ of a regulating transistor Q1, a small ohmic value sensing resistor R1, to be hereinafter described, the collector $c2$ and emitter $e2$ of first protective transistor Q2, and the collector $c3$ and emitter $e3$ of a second protective transistor Q3. The transistor Q1 may represent a larger number of parallel transistors that may be necessary, depending upon the current rating of the supply. Resistors R2 and R3 respectively parallel the protective transistors Q2 and Q3.

The regulating transistor Q1 is normally operative in the controlled region of its characteristic curve. Thus, in a well understood manner, the conductivity of the transistor Q1 is altered in accordance with a suitably obtained signal voltage E1, to maintain substantially constant, the voltage across terminals T3 and T4. Thus the voltage E1 is applied across the base $b1$ and emitter $e1$ of the series regulating transistor Q1.

The protective transistors Q2 and Q3 are saturated during normal operation, and hence do not affect or interact with the regulating transistor Q1.

A voltage source depicted as a battery E2A normally saturates the first protective transistor. The emitter-base circuit of transistor Q2 can be traced from (+) terminal T5, lead L2, terminal T6 in the power lead between resistor R1 and collector $c1$ of the regulating transistor, sensing resistor R1, emitter terminal T7, through the transistor Q2 to base terminal T8, isolating resistor R4 to (−) terminal T9 of the source E2A.

The remaining protective transistors (in this instance only one) follow or reflect the state of the preceding protective transistor. Thus, resulting automatically from the fact that the transistor Q2 is in its on state, the second protective transistor Q3 is caused to assume a corresponding state. For this purpose, a circuit for the base $b3$ of the second protective transistor Q3 is influenced by the state of conductivity of the transistor Q2. The base circuit thus includes, in addition to the source E3, one section R2A of the resistor R2 that parallels the protective transistor Q2. The source E3 is designed to be adequate to saturate the transistor Q3. When the first protective transistor Q2 is on, the voltage drop across the resistor R2A is very small and source E3 saturates transistor Q3. But when transistor Q2 is off, load current must pass through R2. This voltage drop is enough to reduce the voltage difference of the emitter $e3$ and base $b3$, thereby turning the transistor Q3 off. Load current then flows through paralleling resistor R3.

Resistors R2 and R3 are of adequate size to limit load current to tolerable values should protective transistors Q2 and Q3, in response to excessive current, turn off. While the transistors Q2 and Q3 may each represent a number of paralleled transistors, a number of such paralleled transistors should usually not be required. Thus a single conventional transistor can carry a heavy current when saturated.

In order initially to switch the first protective transistor Q2 to its off state, the base terminal T8 is abruptly switched from the potential of the (−) terminal T9 of its source E2A to the (+) potential of a supplemental source E2B. For this purpose, a switching device in the form of a transistor Q4 is provided. The terminal T8 connects to the collector $c4$ of transistor Q4. The transistor Q4 has its emitter $e4$ connected, by a lead L3, to the (+) terminal T10 of the supplemental source E2B. Normally, the switching device or transistor Q4 is in its off state, whereby the source E2B is isolated from the base terminal T8. However, when the switch or transistor Q4 is turned on, the base terminal T8 abruptly assumes the potential of the supplemental source E2B. The (—) terminal of supplemental source E2B is tied to terminal T5, lead L2 and terminal T6. The resistor R4 serves to isolate the (+) terminal of the source E2B from the (—) terminal of the source E2A.

In order to control the switching device or transistor Q4, a flip flop circuit is provided that is controlled by the voltage across the resistor R1. The flip flop circuit FF includes symmetrical resistors Q5 and Q6, having emitters $e5$ and $e6$ connected together and to one terminal T11 of a common feedback or emitter biasing resistor R5. The other side of the feedback resistor R5 connects to the (—) source terminal T9. Each transistor has a separate load resistor R6 and R7 that connects the corresponding collectors $c5$ and $c6$ to the plus terminal T10 of the source E2B. Conveniently the sources E2A and E2B cumulatively drive current through the flip flop FF so that sensitivity is maximized by use of a feedback resistor R5 of good ohmic value.

The transistor Q6 has an input circuit that normally sends base current through the transistor inadequate to turn it on. The circuit can be traced as follows: (+) source terminal T5, a buffering bias source depicted as a battery Ec, resistor R8 to base terminal T12, through transistor to emitter terminal T11, common resistor R5 to (—) battery terminal T9. A transposing resistor R9 connects the collector terminal T13 of transistor Q5 to the base terminal T12 of transistor Q6. When transistor Q5 is on (which it normally is) transposing resistor R9 shunts the base $b6$ and emitter $e6$.

The input circuit for transistor Q5 includes the sensing resistor R1. Normal current through resistor R1 develops a voltage counter to voltage of source E2A. Thus the terminal T6 at the (+) side of resistor R1 is connected to lead L2 and (+) source terminal T5, and the terminal T7 on the (—) side of resistor R1 is connected by a lead L4 to the base $b5$ of transistor Q5.

The circuit design is such that when load current is within rated value, the voltage drop across R1 is inadequate to prevent the battery or source E2A from sending a saturating current through base $b5$. Hence the transistor Q5 is on, and transistor Q6 is off. However, should the load current exceed rated value, then the voltage developed across the sensing resistor R1 will adequately oppose the source E2A, and the transistor Q5 now turns off. Due to the cumulative action of transposing resistor R9 and the bias resistor R5, base current for transistor Q6 is increased, and transistor Q6 is turned on.

Turning on of the transistor Q6 results in the collector terminal T14 moving from the positive potential of source terminal T10 to a much lower potential. This is utilized to cause saturation of the intermediate switching transistor Q4. Thus a lead L5 connects the collector terminal T14 to the base $b4$ of the transistor Q4. The base terminal T8 of the first protective transistor Q2 is then connected via the now on transistor Q4 to the potential of the source terminal T10.

As heretofore described, the turning off of the protective transistor Q2 results in the turning off of the subsequent protective transistor Q3.

Should the current return within rated values, the transistor Q5 will be switched on and the transistor Q6 as a result thereof will be switched off. The terminal T14 will now approach the (+) potential of the source terminal T10 and accordingly the base $b4$ of the transistor Q4 returns to the same potential as the emitter $e4$. The transistor Q4 can no longer be saturated. The base terminal T8 returns to a potential approaching the (—) potential of the source E2A, and transistor Q2 is saturated. This in turn causes transistor Q3 to saturate as heretofore explained. Thus the circuit automatically resets itself.

Figure 2:
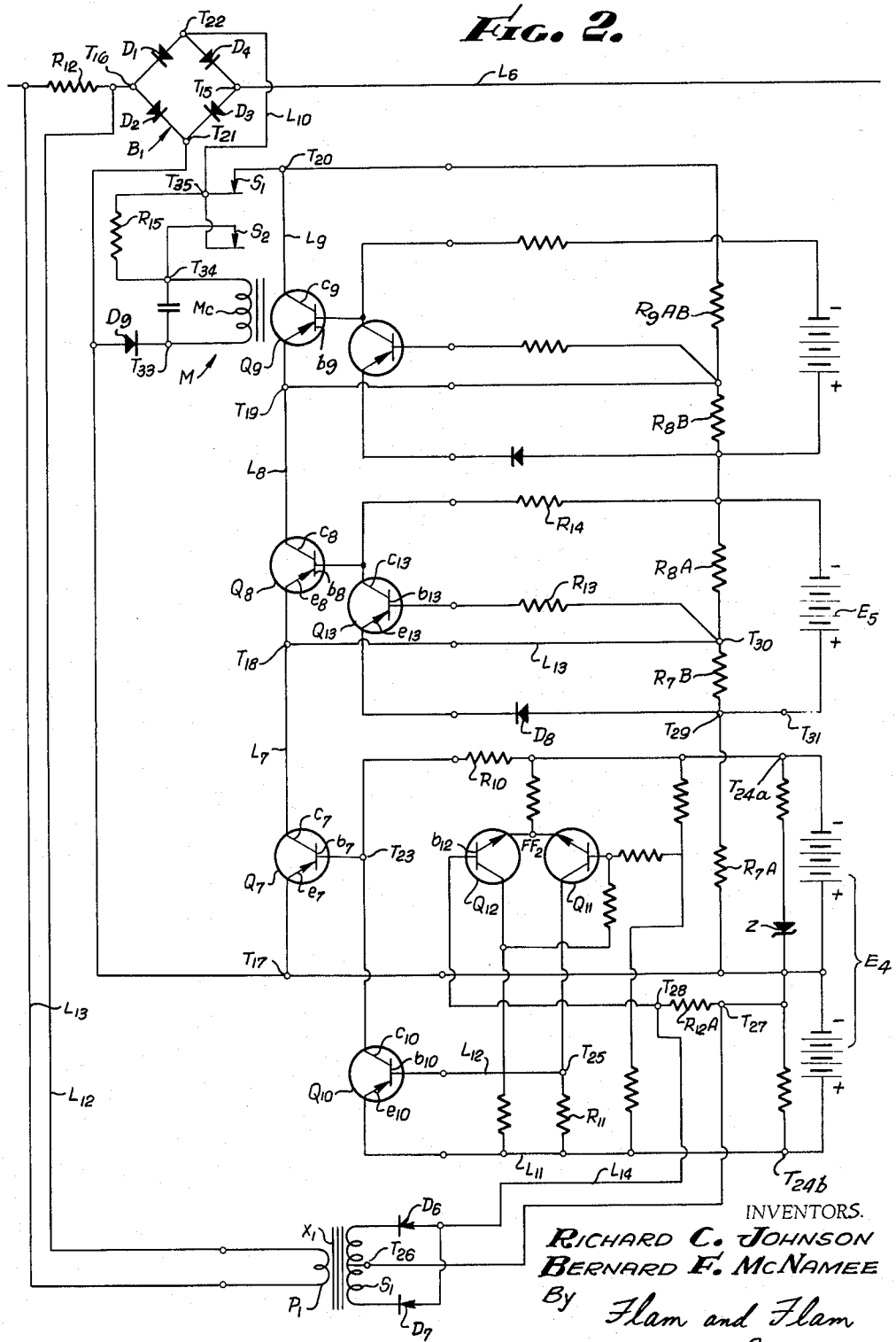
FIG. 2 is a circuit diagram showing another form of the present invention.

In the form illustrated in FIG. 2 similar circuitry is used for protecting an A.C. line. One lead L6 of the A.C. line is illustrated. A required number of protective transistors Q7, Q8 and Q9 are serially inserted in the line. For this purpose, a full wave rectifying bridge B1 is provided that has input terminals T15 and T21 forming part of the line L6. A (+) quadrature terminal T16 is connected to the emitter terminal T17 of the first protective transistor Q7. The collector $c7$ of the transistor is connected by a lead L7 to the emitter terminal T18 of the second protective transistor Q8 and the collector $c8$ of the transistor Q8 is connected by a lead L8 to the emitter terminal T19 of the third protective transistor Q9. The collector $c9$ of the transistor Q9 connects with lead L9 and to one terminal T20 of a normally closed relay switch S1 to be hereinafter described. The other switch terminal T21 is connected to the (—) quadrature terminal T22 of the full wave rectifying bridge B1. Accordingly, the line L6 serially includes the protective transistors Q7, Q8 and Q9.

Conventional diodes D1, D2, D3 and D4 effect a suitable coupling of the protective transistors Q7, Q8 and Q9, whatever may be the relative polarity of the line L6.

The first protective transistor Q7 is controlled in a manner similar to the manner of control of the first protective transistor Q2 of the previous form. The base $b7$ of transistor Q7 is provided with a terminal T23 that can be switched from the negative potential of a source terminal T24$a$ to the positive potential of that source. The source is depicted as a battery E4 whereas a small power supply may be provided for energization from the A.C. lines of which line L6 forms a part. The base terminal T23 is connected to (—) source terminal by an isolating resistor R10.

In order to switch the base $b7$ to the (+) terminal T24 and thereby shut the transistor Q7 off, a switching transistor Q10 is provided that functions in a manner similar to transistor Q4 of the previous form. Thus, the transistor Q10 has its collector $c10$ connected to the base terminal T23. Its emitter $e10$ is connected to a line L11 and the (+) terminal T24$b$.

The switching transistor Q10 is controlled by a flip flop FF2. Thus the base B10 connects via lead L12 to the collector terminal T25 of one normally off transistor Q11 of the flip flop FF2. A load resistor R11 connects the (+) terminal T24 to the collector terminal T25. When transistor Q11 is off, the collector terminal T25, and hence base $b10$ of the switching transistor Q10 is at the same (+) potential as emitter $e10$, and thus protective transistor Q7 is on.

The voltage developed across a small ohmic value resistor R12 inserted in the main line L6 controls the flip flop FF2. But this voltage is an A.C. voltage and must be converted to D.C. form. Conversion is accomplished by rectifying diodes D6 and D7 and a small transformer X1. Leads L12 and L13 apply the voltage developed across the primary sampling resistor R12 to the primary winding P1 of the transformer X1. The secondary winding S1 of the transformer X1 has a center tap or terminal T26 that is connected to one terminal T27 of a resistor R12A. The ends of the secondary S1 are connected via the rectifying diodes D6 and D7 to a common lead L14 and thereby to the other terminal T28 of the resistor R12A. A D.C. voltage across R12A is developed the amplitude of which is a direct function of the A.C. voltage across sensing resistor R12, and thus a direct function of line current.

A voltage dividing network that includes a constant voltage device, in this instance a Zener diode Z, provides a positive potential on the (+) terminal T27 of the current sensing resistor R12A. The (—) terminal of the sensing resistor connects to the base $b12$ of the flip-flop transistor Q12. As in the previous form, the voltage developed across the current sensing resistor R12A opposes the voltage of the source, but not enough to preclude saturation of the transistor Q12.

The companion transistor Q11 is biased by a voltage dividing network. The Zener diode Z provides a relatively elevated source of potential for the base circuit of transistor Q12, ensuring that transistor Q12 is normally on.

Should the current in the line L6 increase beyond a rated value, the voltage developed across the resistor R12A will increase to a point where saturating current cannot be passed through the flip-flop transistor Q12. Accordingly, the transistor Q12 will be turned off and the transistor Q11 will be turned on. The base b10 of the control transistor Q10 will have a negative potential and base current will flow, saturating the transistor Q10 and connecting the base terminal T23 to the (+) terminal T24. The first protective transistor Q7 will then be shut off.

As in the previous form, the operation of the second and subsequent protective transistors Q8 and Q9 follow the state of operation of the first portective transistor Q7. Slightly different circuitry is provided. Switching transistors as at Q13 are used to control the current in second and subsequent protective transistors.

The switching transistor Q13 for the second protective transistor is in turn controlled by the first protective transistor.

Resistors R7A and R7B parallel the transistor Q7. The voltage developed across resistor R7B drives the input circuit of the switching transistor Q13. Thus the (+) terminal T29 of resistor R7B is connected through a diode D8 to the emitter e13, and the (—) terminal T30 of the resistor is connected by a limiting resistor R13 to the base b13. Normally, that is, when the first protective transistor is on, there is inadequate voltage developed across the resistor section R7B to saturate switching transistor Q13. But when the first protective transistor is turned off, current is forced to pass through shunting resistors R7A and R7B. The developed voltage is now adequate to saturate the switching transistor Q13.

When the first protective transistor is on, there is, nevertheless, a very slight voltage drop across it, and therefore a slight voltage drop across resistor R7B. The diode D8 is designed to prevent this small voltage from sending base current through transistor Q13 since, in order for the diode D8 to conduct at all, the voltage must exceed a small characteristic value. The diode D8 has no significant effect when the voltage across R7B is high.

A supplemental source E5 similar to the source E4 drives the input circuit of the second protective transistor Q8. The (+) terminal T31 is connected to the emitter terminal T18 via resistor section R7B. The terminal T31 is common to the (+) terminal of the resistor R7B, and a lead L13 connects the (—) terminal of resistor R7B to the emitter terminal T18 of transistor Q8. The (—) terminal of source E5 is connected to the base b8 via a current limiting resistor R14. The source E5 normally saturates the transistor Q8. But when the switching transistor Q13 is turned on, the base b8 of the transistor is now connected, via switching transistor Q13, to the (+) terminal of the source E5. The second protective transistor thus turns off.

Resistors R8A and R8B parallel the emitter and collector of the transistor Q8, and the voltage developed across the resistor section Q8B similarly controls the third or next protective transistor Q9 by circuitry similar to that just described for the second protective transistor.

During conditions of overload the current is absorbed by the resistors R7A, R7B, R8A, R8B and finally resistor R9AB that parallels the transistor Q9.

In order to make it possible to use resistors of modest power rating, they need be operative only for the split second when overload first ocurs. Thus, a relay M is provided that is also operated upon the existence of excessive current in the line L6. Of course, the relay M is slow acting compared to the flip-flop circuit FF2. However, it complements the fast-acting circuitry just described for economy in rating of circuit components.

The coil Mc of the relay is, like the protective transistors, connected across the quadrature terminals of the bridge B1. The circuit can be traced as follows: (+) terminal T21, a rectifying diode D9, a terminal T33 on one side of the coil Mc, through the coil to the opposite terminal T34 and thence via normally closed relay switch S2 to the terminal T35, line L10 and the (—) terminal T22 of bridge B1. When protective transistors Q7, Q8 and Q9 are on, the coil Mc is effectively shunted, and no appreciable current is drawn. But when protective transistors Q7, Q8 and Q9 turn off, the resistance of coil Mc is not so large in comparison to shunting resistors R7A, R7B, etc. Hence current is drawn, and the relay operates.

The switch S1 disconnects the protective relays Q7, Q8 and Q9 and their shunting resistors from the line L6. At the same time the switch S2 opens to insert a resistor R15 in the coil circuit that reduces the current to a holding value. The resistor R15 parallels the terminals T21 and T34 across which the normally closed relay switch is connected. The ohmic size of resistor R15 is chosen to ensure against drop out of coil Mc for the lowest voltage which occurs between terminals T21 and T22 during overload. The resistor R15 is of adequate size to protect the coil Mc during high overload conditions.

When the switch S1 is opened, the resistors R7, 8, 9 are disconnected from the bridge B1 and all current in line L6 is cut off except the current that can flow through the holding circuit for the relay M. When the source driving the line L1 is shut off, the relay M is reset.

We claim:

1. In an overload protective circuit for a power supply: a series regulating transistor the rating of which may be exceeded upon overload; at least two protective transistors serially associated with the regulating transistor each having an on state and an off state; a high impedance shunt for each of the protective transistors; circuits normally biasing the protective transistors to their on states; a circuit responsive to the intensity of current through the regulating transistor for counteracting the biasing means of the first protective transistor to switch the current to the corresponding shunt; and circuit means responsive to an increase in current through the shunt of the first protective transistor for counteracting the biasing means of the second protective transistor to switch the current to the corresponding shunt.

2. In an overload protective circuit for a power supply: a series regulating transistor the rating of which may be exceeded upon overload; at least two protective transistors serially associated with the regulating transistor each having an on state and an off state; a high impedance shunt for each of the protective transistors; circuits normally biasing the protective transistors to their on states; a circuit responsive to the intensity of current through the regulating transistor for counteracting the biasing means of the first protective transistor to switch the current to the corresponding shunt; and circuit means responsive to an increase in current through the shunt of the first protective transistor for counteracting the biasing means of the second protective transistor to switch the current to the corresponding shunt, the shunts limiting current to a value such that the regulating transistor in response to output sensing means becomes saturated.

3. In an overload protective circuit for a current carrying line: at least two overload protective transistors each having an on state and an off state; means serially coupling the protective transistors to the line; circuit means for each protective transistor biasing the corresponding transistor to its on state; a circuit responsive to the intensity of current in the line for counteracting the biasing circuit of one of the protective transistors for switching said one protective transistor to its off state; impedance means shunting said one protective transistor; means responsive to increase in level of current in the shunting impedance means corresponding to line overload, for counteracting the biasing circuit of the second protective transistor for switching it off; and a relay having a coil normally paralleling said protective transistors for energization when said protective transistors assume their off states, said relay having contact means for disconnecting the shunting impedance means when the relay operates.

4. In an overload protective circuit for a current carrying line: at least two overload protective transistors each having an on state and an off state; means serially coupling the protective transistors to the line; circuit means for each protective transistor biasing the corresponding transistors to its on state; a circuit responsive to the intensity of current in the line for counteracting the biasing circuit of one of the protective transistors for switching said one protective transistor to its off state; impedance means shunting said one protective transistor; means responsive to increase in level of current in the shunting impedance means corresponding to line overload, for counteracting the biasing circuit of the second protective transistor for switching it off; and a relay having a coil normally paralleling said protective transistors for energization when said protective transistors assume their off states, said relay having contact means for disconnecting the shunting impedance means when the relay operates, said relay also having another contact means for inserting added impedance in series with the relay coil and therefore in series with the line when the relay operates.

5. In an overload protective circuit for an A.C. line at least two overload protective transistors each having an on state and an off state; bridge means inserted in the line and providing polarized terminals that must be connected for continuity of the A.C. line; means serially connecting the transistors to each other and across said terminals; means biasing the protective transistors to their on states; sensing circuit means responsive to overload in the line for counteracting the biasing means of one of said transistors for switching it off; impedance means shunting said one protective transistor; means responsive to increase in the level of current in the shunting impedance means corresponding to line overload for counteracting the biasing means of the second protective transistor for switching it off; impedance means shunting said second protective transistor; a relay having a coil connected across said polarized terminals for operation when said protective transistors are in their off state; and a circuit made operative upon operation of the relay coil for sustaining the current after the initial condition of overload.

References Cited by the Examiner
UNITED STATES PATENTS

| | | | |
|---|---|---|---|
| 2,888,633 | 5/1959 | Carter | 323—9 |
| 2,915,693 | 12/1959 | Harrison | 317—33 |
| 3,067,338 | 12/1962 | Baude | 317—148.5 |

FOREIGN PATENTS 872,933  7/1961  Great Britain.

SAMUEL BERNSTEIN, *Primary Examiner.*

MAX L. LEVY, *Examiner.*